United States Patent
Lee et al.

(10) Patent No.: US 10,122,518 B2
(45) Date of Patent: Nov. 6, 2018

(54) METHOD FOR SHARING WIRELESS RESOURCE INFORMATION IN MULTI-CELL WIRELESS COMMUNICATION SYSTEM AND APPARATUS FOR SAME

(71) Applicant: LG ELECTRONICS INC., Seoul (KR)

(72) Inventors: Seungmin Lee, Anyang-si (KR); Hanbyul Seo, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 192 days.

(21) Appl. No.: 14/758,743

(22) PCT Filed: Dec. 30, 2013

(86) PCT No.: PCT/KR2013/012388
§ 371 (c)(1),
(2) Date: Jun. 30, 2015

(87) PCT Pub. No.: WO2014/104855
PCT Pub. Date: Jul. 3, 2014

(65) Prior Publication Data
US 2015/0358142 A1     Dec. 10, 2015

Related U.S. Application Data

(60) Provisional application No. 61/767,243, filed on Feb. 20, 2013, provisional application No. 61/747,360, filed on Dec. 30, 2012.

(51) Int. Cl.
*H04L 5/00* (2006.01)
*H04W 24/08* (2009.01)
(Continued)

(52) U.S. Cl.
CPC .......... *H04L 5/0073* (2013.01); *H04L 5/0044* (2013.01); *H04L 5/1469* (2013.01);
(Continued)

(58) Field of Classification Search
CPC ..................................................... H04L 63/323
(Continued)

(56) References Cited

U.S. PATENT DOCUMENTS

2011/0149813 A1   6/2011   Parkvall et al.
2012/0230232 A1*  9/2012   Ji ........................ H04B 7/2656
                                                                370/280

(Continued)

FOREIGN PATENT DOCUMENTS

CN       102771069 A       11/2012
KR    10-2012-0103200 A     9/2012
KR    10-2012-0116271 A    10/2012

OTHER PUBLICATIONS

Ericsson et al., "Specification impact of TDD traffic adaptation," 3GPP TSG-RAN WG1 #68bis, Mar. 26-30, 2012, pp. 1-3, R1-121709.
(Continued)

*Primary Examiner* — Robert M Morlan
*Assistant Examiner* — Pamit Kaur
(74) *Attorney, Agent, or Firm* — Birch, Stewart, Kolasch & Birch, LLP

(57) ABSTRACT

The present invention relates to a method for user equipment transmitting/receiving signals in a multi-cell wireless communication system. More specifically, the method far the user equipment transmitting/receiving signals in the multi-cell wireless communication system comprises a step of transmitting/receiving the signals by using a specific radio resource, wherein the specific radio resource is set so that the (Continued)

use of the radio resource is modified based on a predetermined time section between a serving cell and a neighbor cell.

7 Claims, 10 Drawing Sheets

(51) Int. Cl.
  *H04W 72/04* (2009.01)
  *H04W 72/08* (2009.01)
  *H04L 5/14* (2006.01)
(52) U.S. Cl.
  CPC ....... *H04W 24/08* (2013.01); *H04W 72/0446* (2013.01); *H04W 72/082* (2013.01); *H04L 5/0007* (2013.01)
(58) Field of Classification Search
  USPC ........................................ 370/252
  See application file for complete search history.

(56) References Cited

U.S. PATENT DOCUMENTS

| 2012/0263057 | A1  | 10/2012 | Choi et al. |
| 2012/0307717 | A1* | 12/2012 | Worrall ............ H04B 7/15557 370/315 |
| 2013/0208604 | A1* | 8/2013  | Lee .................. H04L 25/0226 370/252 |
| 2013/0301450 | A1* | 11/2013 | Geirhofer ............ H04L 5/0057 370/252 |
| 2014/0119261 | A1* | 5/2014  | Wang ................ H04W 72/04 370/312 |

OTHER PUBLICATIONS

Renesas Mobile Europe Ltd., "Discussion on Enhancements for Dynamic TDD UL-DL Configuration," 3GPP TSG-RAN WG1 Meeting #69, May 21-25, 2012, 4 pages, R1-122363.

* cited by examiner (a) Control-plane protocol stack (b) User-plane protocol stack

METHOD FOR SHARING WIRELESS RESOURCE INFORMATION IN MULTI-CELL WIRELESS COMMUNICATION SYSTEM AND APPARATUS FOR SAME

CROSS REFERENCE TO RELATED APPLICATIONS

This application is the National Phase of PCT International Application No. PCT/KR2013/012388, filed on Dec. 30, 2013, which claims priority under 35 U.S.C. 119(e) to U.S. Provisional Application Nos. 61/747,360 and 61/767,243, filed on Dec. 30, 2012 and Feb. 20, 2013 respectively, all of which are hereby expressly incorporated by reference into the present application.

TECHNICAL FIELD

The present invention relates to a wireless communication system, and more particularly, to a method for sharing a radio resource information in a multi-cell wireless communication system and apparatus for the same.

BACKGROUND ART

A 3rd generation partnership project long term evolution (3GPP LTE) (hereinafter, referred to as 'LTE') communication system which is an example of a wireless communication system to which the present invention can be applied will be described in brief.

FIG. 1 is a diagram illustrating a network structure of an Evolved Universal Mobile Telecommunications System (E-UMTS) which is an example of a wireless communication system. The E-UMTS is an evolved version of the conventional UMTS, and its basic standardization is in progress under the 3rd Generation Partnership Project (3GPP). The E-UMTS may be referred to as a Long Term Evolution (LTE) system. Details of the technical specifications of the UMTS and E-UMTS may be understood with reference to Release 7 and Release 8 of "3rd Generation Partnership Project; Technical Specification Group Radio Access Network".

Referring to FIG. 1, the E-UMTS includes a User Equipment (UE), base stations (eNode B; eNB), and an Access Gateway (AG) which is located at an end of a network (E-UTRAN) and connected to an external network. The base stations may simultaneously transmit multiple data streams for a broadcast service, a multicast service and/or a unicast service.

One or more cells exist for one base station. One cell is set to one of bandwidths of 1.44, 3, 5, 10, 15 and 20 MHz to provide a downlink or uplink transport service to several user equipments. Different cells may be set to provide different bandwidths. Also, one base station controls data transmission and reception for a plurality of user equipments. The base station transmits downlink (DL) scheduling information of downlink data to the corresponding user equipment to notify the corresponding user equipment of time and frequency domains to which data will be transmitted and information related to encoding, data size, and hybrid automatic repeat and request (HARQ). Also, the base station transmits uplink (UL) scheduling information of uplink data to the corresponding user equipment to notify the corresponding user equipment of time and frequency domains that can be used by the corresponding user equipment, and information related to encoding, data size, and HARQ. An interface for transmitting user traffic or control traffic may be used between the base stations. A Core Network (CN) may include the AG and a network node or the like for user registration of the user equipment. The AG manages mobility of the user equipment on a Tracking Area (TA) basis, wherein one TA includes a plurality of cells.

Although the wireless communication technology developed based on WCDMA has been evolved into LTE, request and expectation of users and providers have continued to increase. Also, since another wireless access technology is being continuously developed, new evolution of the wireless communication technology will be required for competitiveness in the future. In this respect, reduction of cost per bit, increase of available service, use of adaptable frequency band, simple structure and open type interface, proper power consumption of the user equipment, etc. are required.

DISCLOSURE OF THE INVENTION

Technical Task

The technical task of the present invention is to provide a method for sharing a radio resource information in a wireless communication system and apparatus for the same.

Technical tasks obtainable from the present invention are non-limited by the above-mentioned technical task. And, other unmentioned technical tasks can be clearly understood from the following description by those having ordinary skill in the technical field to which the present invention pertains.

Technical Solutions

In a $1^{st}$ technical aspect of the present invention, provided herein is a method of sharing a radio resource information, which is performed by a cell in a multi-cell wireless communication system, including the steps of transmitting the radio resource information to a neighbor cell and receiving an acknowledgement message from the neighbor cell in response to the radio resource information, wherein the radio resource information corresponds to an information for a usage change of a radio resource of a specific radio resource region and wherein the acknowledgement message corresponds to a message indicating whether the usage change of the radio resource is allowed in the neighbor cell.

Preferably, the acknowledgement message is determined by the neighbor cell based on at least one of an uplink-downlink communication load state of the neighbor cell and an expected interference amount on the specific radio resource region.

Preferably, the acknowledgement message is transmitted based on either a predefined physical wireless channel or an X2 interface.

Preferably, the specific radio resource region is configured to make the neighbor cell not perform uplink-downlink communication.

Preferably, the acknowledgement message indicates that the usage change of the radio resource is not allowed on the specific radio resource region and further includes the step of receiving a recommended radio resource usage change information from the neighbor cell.

Preferably, the radio resource information includes an information on at least one or more candidate uplink-downlink (UL-DL) configurations and the acknowledgement message includes an information on a specific UL-DL configuration allowed in the neighbor cell among the at least one or more candidate UL-DL configurations.

Preferably, the neighbor cell corresponds to a cell of which a time synchronization difference value with the cell is less than or equal to a prescribed threshold value.

Preferably, the radio resource information includes an information on the number of subframes in which the usage change of the radio resource is performed.

Preferably, the specific radio resource region includes a radio resource for transceiving a specific reference signal. More preferably, the specific reference signal is configured in accordance with a predefined reference signal configuration information and the reference signal configuration information includes at least one selected from the group consisting of the number of antenna ports, a physical cell identifier, a virtual cell identifier, a type of a reference signal, a configuration index and a transmission power of a reference signal.

Preferably, the radio resource information includes at least one of a subframe of a specific timing and a usage of the subframe of the specific timing. The radio resource information further includes either an information on an uplink control channel transmission region or an information on a specific reference signal transmission region.

Preferably, the usage change of the radio resource is configured to use a radio resource configured for uplink communication for downlink communication or use a radio resource configured for the downlink communication for the uplink communication.

Preferably, the radio resource information further includes an information on a resource utilization rate of the specific radio resource region.

In a $2^{nd}$ technical aspect of the present invention, provided herein is a method of sharing a radio resource information in a multi-cell wireless communication system, including the steps of receiving the radio resource information from a specific cell, determining whether to allow a usage change of a radio resource of the specific cell based on the radio resource information and an uplink-downlink communication load state and transmitting an acknowledgement message indicating whether to allow the usage change of the radio resource to the specific cell, wherein the radio resource information corresponds to an information for the specific cell to change a usage of a radio resource of a specific radio resource region.

Advantageous Effects

According to the present invention, in case of dynamically changing a radio resource in accordance with a system load in a wireless communication system, communication can be efficiently performed in a manner of sharing an information on the corresponding radio resource by a number of cells with each other.

Effects obtainable from the present invention are non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

BEST MODE FOR INVENTION

The following technology may be used for various wireless access technologies such as CDMA (code division multiple access), FDMA (frequency division multiple access), TDMA (time division multiple access), OFDMA (orthogonal frequency division multiple access), and SC-FDMA (single carrier frequency division multiple access). The CDMA may be implemented by the radio technology such as UTRA (universal terrestrial radio access) or CDMA2000. The TDMA may be implemented by the radio technology such as global system for mobile communications (GSM)/general packet radio service (GPRS)/enhanced data rates for GSM evolution (EDGE). The OFDMA may be implemented by the radio technology such as IEEE 802.11 (Wi-Fi), IEEE 802.16 (WiMAX), IEEE 802.20, and evolved UTRA (E-UTRA). The UTRA is a part of a universal mobile telecommunications system (UMTS). A 3rd generation partnership project long term evolution (3GPP LTE) is a part of an evolved UMTS (E-UMTS) that uses E-UTRA, and adopts OFDMA in a downlink and SC-FDMA in an uplink. LTE-advanced (LTE-A) is an evolved version of the 3GPP LTE.

For clarification of the description, although the following embodiments will be described based on the 3GPP LTE/LTE-A, it is to be understood that the technical spirits of the present invention are not limited to the 3GPP LTE/LTE-A. Also, specific terminologies hereinafter used in the embodiments of the present invention are provided to assist understanding of the present invention, and various modifications may be made in the specific terminologies within the range that they do not depart from technical spirits of the present invention.

Figure 1:
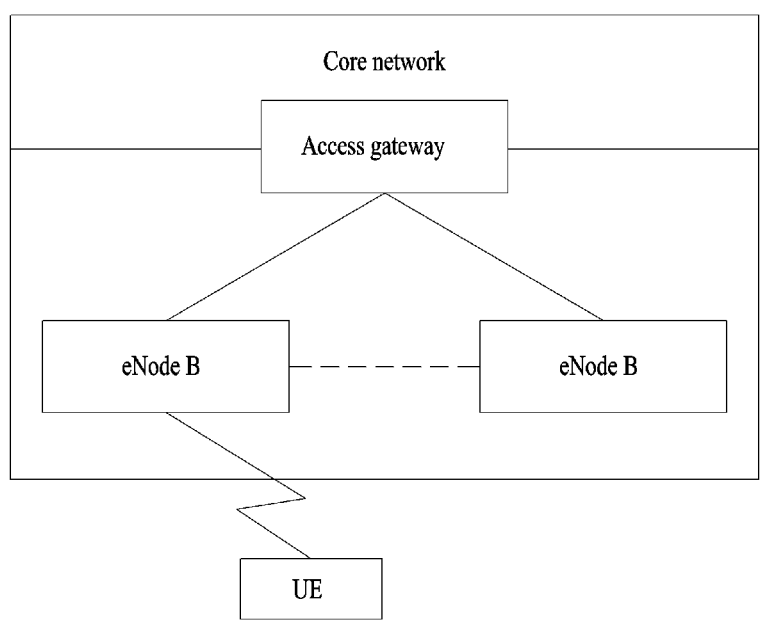
FIG. 1 is a schematic diagram of E-UMTS network structure as one example of a wireless communication system.
Figure 2:
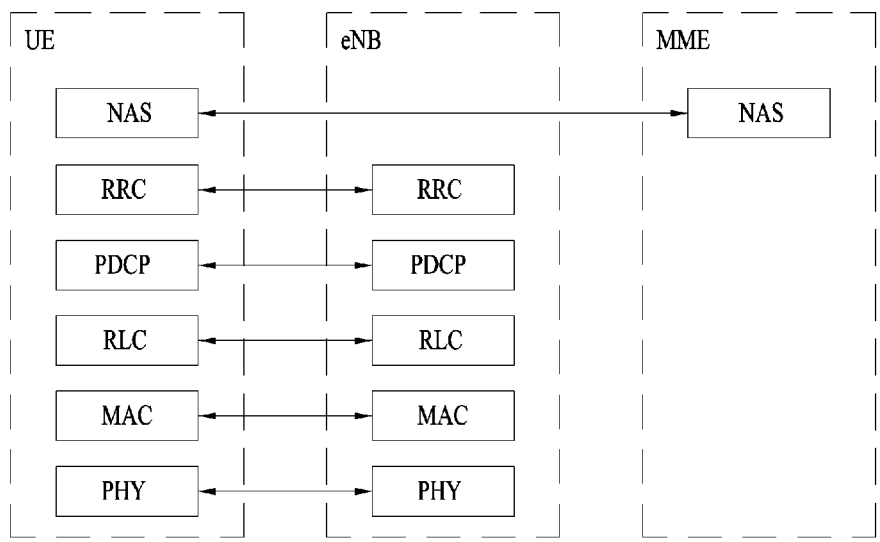
FIG. 2 is a diagram of structures of control and user planes of a radio interface protocol between a user equipment and E-UTRAN based on 3GPP radio access network standard.
Figure 2:
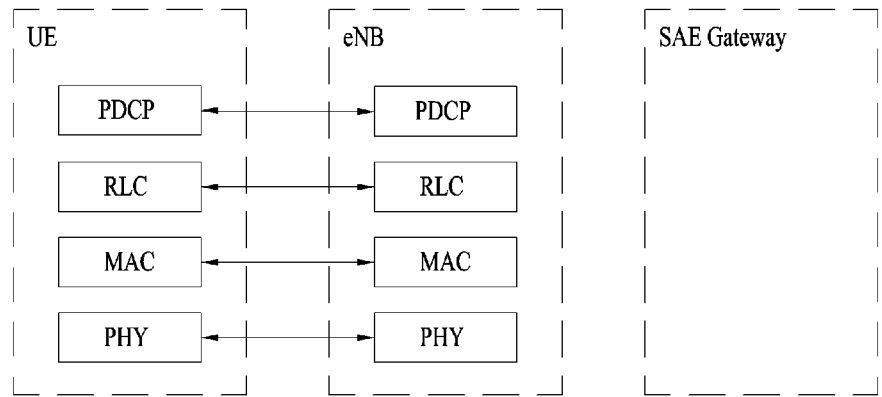

FIG. 2 is a diagram illustrating structures of a control plane and a user plane of a radio interface protocol between a user equipment and E-UTRAN based on the 3GPP radio access network standard. The control plane means a passageway where control messages are transmitted, wherein the control messages are used by the user equipment and the network to manage call. The user plane means a passageway where data generated in an application layer, for example, voice data or Internet packet data are transmitted.

A physical layer as the first layer provides an information transfer service to an upper layer using a physical channel. The physical layer is connected to a medium access control (MAC) layer via a transport channel, wherein the medium access control layer is located above the physical layer. Data are transferred between the medium access control layer and the physical layer via the transport channel. Data are transferred between one physical layer of a transmitting side and the other physical layer of a receiving side via the physical channel. The physical channel uses time and frequency as radio resources. In more detail, the physical channel is modulated in accordance with an orthogonal frequency division multiple access (OFDMA) scheme in a downlink, and is modulated in accordance with a single carrier frequency division multiple access (SC-FDMA) scheme in an uplink.

A medium access control (MAC) layer of the second layer provides a service to a radio link control (RLC) layer above the MAC layer via a logical channel. The RLC layer of the second layer supports reliable data transmission. The RLC layer may be implemented as a functional block inside the MAC layer. In order to effectively transmit data using IP packets such as IPv4 or IPv6 within a radio interface having a narrow bandwidth, a packet data convergence protocol (PDCP) layer of the second layer performs header compression to reduce the size of unnecessary control information.

A radio resource control (RRC) layer located on the lowest part of the third layer is defined in the control plane only. The RRC layer is associated with configuration, re-configuration and release of radio bearers ('RBs') to be in charge of controlling the logical, transport and physical channels. In this case, the RB means a service provided by the second layer for the data transfer between the user equipment and the network. To this end, the RRC layers of the user equipment and the network exchange RRC message with each other. If the RRC layer of the user equipment is RRC connected with the RRC layer of the network, the user equipment is in an RRC connected mode. If not so, the user equipment is in an RRC idle mode. A non-access stratum (NAS) layer located above the RRC layer performs functions such as session management and mobility management.

One cell constituting a base station eNB is set to one of bandwidths of 1.4, 3.5, 5, 10, 15, and 20 MHz and provides a downlink or uplink transmission service to several user equipments. At this time, different cells may be set to provide different bandwidths.

As downlink transport channels carrying data from the network to the user equipment, there are provided a broadcast channel (BCH) carrying system information, a paging channel (PCH) carrying paging message, and a downlink shared channel (SCH) carrying user traffic or control messages. Traffic or control messages of a downlink multicast or broadcast service may be transmitted via the downlink SCH or an additional downlink multicast channel (MCH). Meanwhile, as uplink transport channels carrying data from the user equipment to the network, there are provided a random access channel (RACH) carrying an initial control message and an uplink shared channel (UL-SCH) carrying user traffic or control message. As logical channels located above the transport channels and mapped with the transport channels, there are provided a broadcast control channel (BCCH), a paging control channel (PCCH), a common control channel (CCCH), a multicast control channel (MCCH), and a multicast traffic channel (MTCH).

Figure 3:
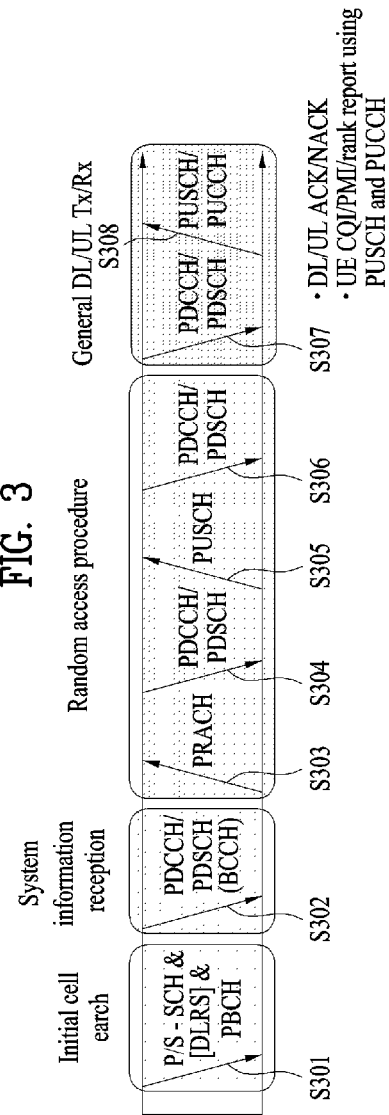
FIG. 3 is a diagram for explaining physical channels used for 3GPP LTE system and a general method of transmitting a signal using the same.

FIG. 3 is a diagram illustrating physical channels used in a 3GPP LTE system and a general method for transmitting a signal using the physical channels.

The user equipment performs initial cell search such as synchronizing with the base station when it newly enters a cell or the power is turned on at step S301. To this end, the user equipment synchronizes with the base station by receiving a primary synchronization channel (P-SCH) and a secondary synchronization channel (S-SCH) from the base station, and acquires information such as cell ID, etc. Afterwards, the user equipment may acquire broadcast information within the cell by receiving a physical broadcast channel (PBCH) from the base station. Meanwhile, the user equipment may identify a downlink channel status by receiving a downlink reference signal (DL RS) at the initial cell search step.

The user equipment which has finished the initial cell search may acquire more detailed system information by receiving a physical downlink shared channel (PDSCH) in accordance with a physical downlink control channel (PDCCH) and information carried in the PDCCH at step S302.

Afterwards, the user equipment may perform a random access procedure (RACH) such as steps S303 to S306 to complete access to the base station. To this end, the user equipment may transmit a preamble through a physical random access channel (PRACH) (S303), and may receive a response message to the preamble through the PDCCH and the PDSCH corresponding to the PDCCH (S304). In case of a contention based RACH, the user equipment may perform a contention resolution procedure such as transmission (S305) of additional physical random access channel and reception (S306) of the physical downlink control channel and the physical downlink shared channel corresponding to the physical downlink control channel.

The user equipment which has performed the aforementioned steps may receive the physical downlink control channel (PDCCH)/physical downlink shared channel (PDSCH) (S307) and transmit a physical uplink shared channel (PUSCH) and a physical uplink control channel (PUCCH) (S308), as a general procedure of transmitting uplink/downlink signals. Control information transmitted from the user equipment to the base station will be referred to as uplink control information (UCI). The UCI includes HARQ ACK/NACK (Hybrid Automatic Repeat and reQuest Acknowledgement/Negative-ACK), SR (Scheduling Request), CSI (Channel State Information), etc. In this specification, the HARQ ACK/NACK will be referred to as HARQ-ACK or ACK/NACK (A/N). The HARQ-ACK includes at least one of positive ACK (simply, referred to as ACK), negative ACK (NACK), DTX and NACK/DTX. The CSI includes CQI (Channel Quality Indicator), PMI (Precoding Matrix Indicator), RI (Rank Indication), etc. Although the UCI is generally transmitted through the PUCCH, it may be transmitted through the PUSCH if control information and traffic data should be transmitted at the same time. Also, the user equipment may non-periodically transmit the UCI through the PUSCH in accordance with request/command of the network.

Figure 4:
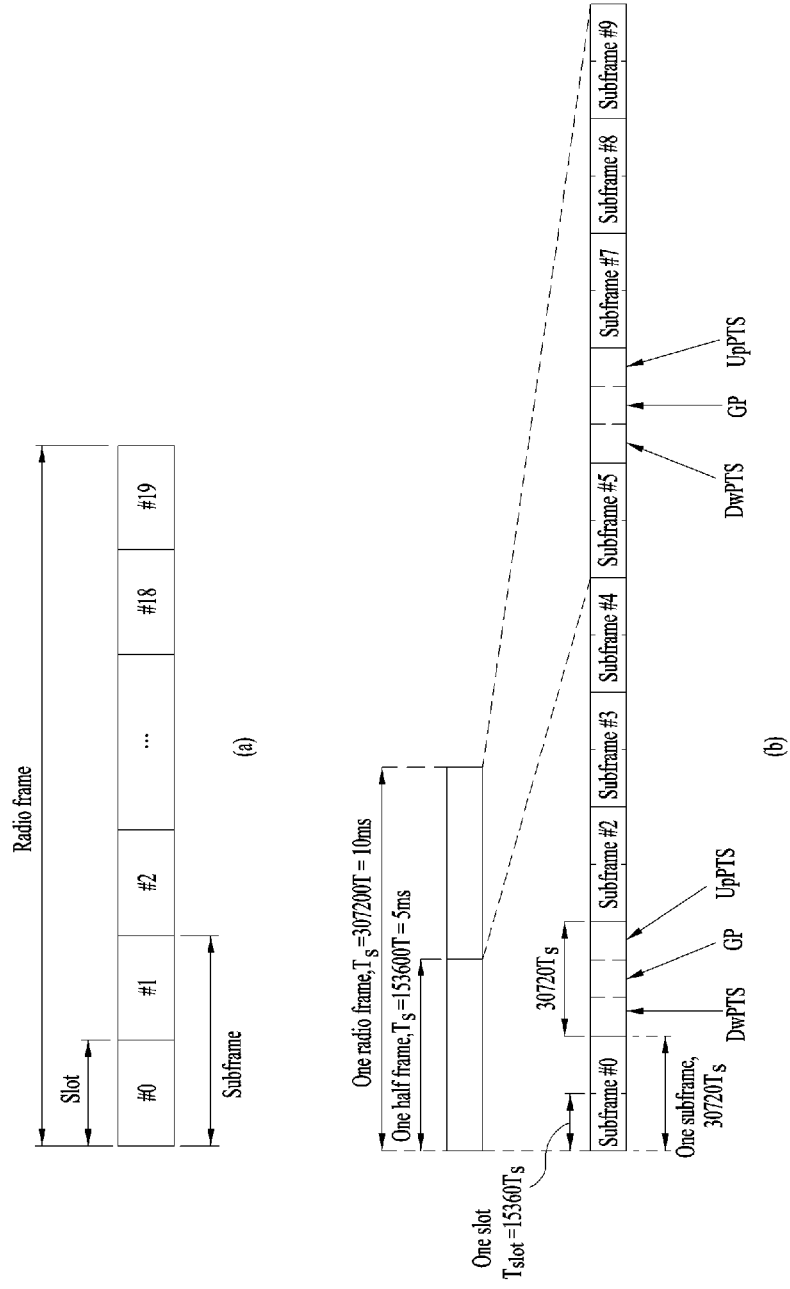
FIG. 4 is a diagram for a structure of a radio frame used in LTE system.

FIG. 4 is a diagram illustrating a structure of a radio frame used in an LTE system.

Referring to FIG. 4, in a cellular OFDM radio packet communication system, uplink/downlink data packet transmission is performed in a unit of subframe, wherein one subframe is defined by a given time interval that includes a plurality of OFDM symbols. The 3GPP LTE standard supports a type 1 radio frame structure applicable to frequency division duplex (FDD) and a type 2 radio frame structure applicable to time division duplex (TDD).

FIG. 4(a) is a diagram illustrating a structure of a type 1 radio frame. The downlink radio frame includes 10 subframes, each of which includes two slots in a time domain. A time required to transmit one subframe will be referred to as a transmission time interval (TTI). For example, one subframe may have a length of 1 ms, and one slot may have a length of 0.5 ms. One slot includes a plurality of OFDM symbols in a time domain and a plurality of resource blocks (RB) in a frequency domain. Since the 3GPP LTE system uses OFDM in a downlink, OFDM symbols represent one symbol interval. The OFDM symbol may be referred to as SC-FDMA symbol or symbol interval. The resource block (RB) as a resource allocation unit may include a plurality of continuous subcarriers in one slot.

The number of OFDM symbols included in one slot may be varied depending on configuration of a cyclic prefix (CP). Examples of the CP include an extended CP and a normal CP. For example, if the OFDM symbols are configured by the normal CP, the number of OFDM symbols included in one slot may be 7. If the OFDM symbols are configured by the extended CP, since the length of one OFDM symbol is increased, the number of OFDM symbols included in one slot is smaller than that of OFDM symbols in case of the normal CP. For example, in case of the extended CP, the number of OFDM symbols included in one slot may be 6. If a channel state is unstable like the case where the user equipment moves at high speed, the extended CP may be used to reduce inter-symbol interference.

If the normal CP is used, since one slot includes seven OFDM symbols, one subframe includes 14 OFDM symbols. At this time, first maximum three OFDM symbols of each subframe may be allocated to a physical downlink control channel (PDCCH), and the other OFDM symbols may be allocated to a physical downlink shared channel (PDSCH).

FIG. 4(b) is a diagram illustrating a structure of a type 2 radio frame. The type 2 radio frame includes two half frames, each of which includes four general subframes, which include two slots, and a special subframe which includes a downlink pilot time slot (DwPTS), a guard period (GP), and an uplink pilot time slot (UpPTS).

In the special subframe, the DwPTS is used for initial cell search, synchronization or channel estimation at the user equipment. The UpPTS is used for channel estimation at the base station and uplink transmission synchronization of the user equipment. In other words, the DwPTS is used for downlink transmission, whereas the UpPTS is used for uplink transmission. Especially, the UpPTS is used for PRACH preamble or SRS transmission. Also, the guard period is to remove interference occurring in the uplink due to multipath delay of downlink signals between the uplink and the downlink.

Configuration of the special subframe is defined in the current 3GPP standard document as illustrated in Table 1 below. Table 1 illustrates the DwPTS and the UpPTS in case of $T_s=1/(15000 \times 2048)$, and the other region is configured for the guard period.

TABLE 1

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | $12800 \cdot T_s$ | | |
| 8 | $24144 \cdot T_s$ | | | — | — | — |
| 9 | $13168 \cdot T_s$ | | | — | — | — |

In the meantime, the structure of the type 2 radio frame, that is, uplink/downlink configuration (UL/DL configuration) in the TDD system is as illustrated in Table 2 below.

TABLE 2

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In the above Table 2, D means the downlink subframe, U means the uplink subframe, and S means the special subframe. Also, Table 2 also illustrates a downlink-uplink switching period in the uplink/downlink subframe configuration of each system.

The structure of the aforementioned radio frame is only exemplary, and various modifications may be made in the number of subframes included in the radio frame, the number of slots included in the subframe, or the number of symbols included in the slot.

Figure 5:
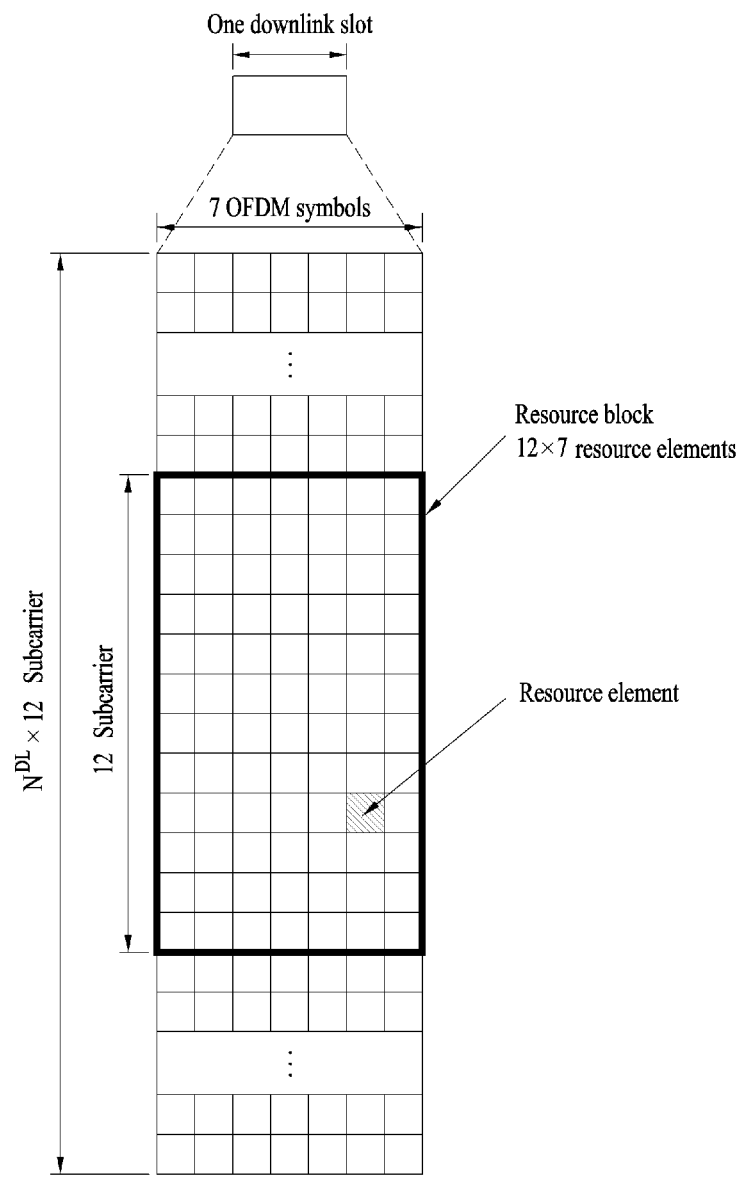
FIG. 5 is a diagram of a resource grid for a downlink slot.

FIG. 5 is a diagram illustrating a resource grid of a downlink slot.

Referring to FIG. 5, the downlink slot includes a plurality of $N_{symb}^{DL}$ OFDM symbols in a time domain and a plurality of $N_{RB}^{DL}$ resource blocks in a frequency domain. Since each resource block includes $N_{sc}^{RB}$ subcarriers, the downlink slot includes $N_{RB}^{DL} \times N_{sc}^{RB}$ subcarriers in the frequency domain. Although FIG. 5 illustrates that the downlink slot includes seven OFDM symbols and the resource block includes twelve subcarriers, it is to be understood that the downlink slot and the resource block are not limited to the example of FIG. 5. For example, the number of OFDM symbols included in the downlink slot may be varied depending on the length of the CP.

Each element on the resource grid will be referred to as a resource element (RE). One resource element is indicated by one OFDM symbol index and one subcarrier index. One RB includes $N_{symb}^{DL} \times N_{sc}^{RB}$ of resource elements. The number $N_{RB}^{DL}$ of resource blocks included in the downlink slot depends on a downlink transmission bandwidth configured in the cell.

Figure 6:
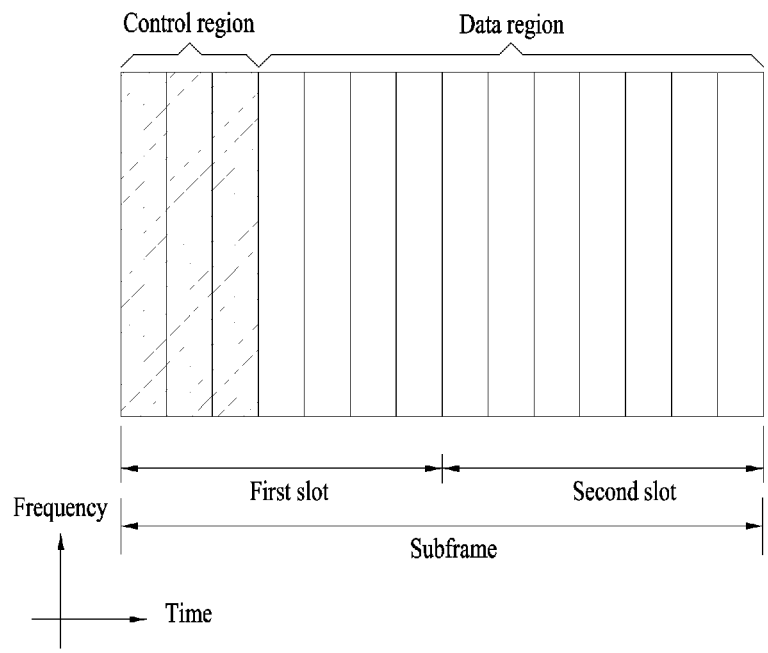
FIG. 6 is a diagram for an example of a structure of a downlink subframe.

FIG. 6 is a diagram illustrating a structure of a downlink subframe.

Referring to FIG. 6, maximum three (four) OFDM symbols located at the front of the first slot of the subframe correspond to a control region to which a control channel is allocated. The other OFDM symbols correspond to a data region to which a physical downlink shared channel (PDSCH) is allocated. Examples of downlink control channels used in the LTE system include a Physical Control Format Indicator Channel (PCFICH), a Physical Downlink Control Channel (PDCCH), and a Physical Hybrid ARQ Indicator Channel (PHICH). The PCFICH is transmitted from the first OFDM symbol of the subframe, and carries information on the number of OFDM symbols used for transmission of the control channel within the subframe. The PHICH carries HARQ ACK/NACK (Hybrid Automatic Repeat reQuest acknowledgement/negative-acknowledgement) signals in response to uplink transmission.

The control information transmitted through the PDCCH will be referred to as downlink control information (DCI). The DCI includes resource allocation information for a user equipment or user equipment group. For example, the DCI includes uplink/downlink scheduling information, uplink transmission (Tx) power control command, etc.

The PDCCH may include transport format and resource allocation information of a downlink shared channel (DL-SCH), transport format and resource allocation information of an uplink shared channel (UL-SCH), paging information on a paging channel (PCH), system information on the DL-SCH, resource allocation information of upper layer control message such as random access response transmitted on the PDSCH, a set of transmission (Tx) power control commands of individual user equipments (UEs) within a random user equipment group, transmission (Tx) power control command, and activity indication information of voice over Internet protocol (VoIP). A plurality of PDCCHs may be transmitted within the control region. The user equipment may monitor the plurality of PDCCHs. The PDCCH is transmitted on aggregation of one or a plurality of continuous control channel elements (CCEs). The CCE is a logic allocation unit used to provide the PDCCH with a coding rate based on the status of a radio channel. The CCE corresponds to a plurality of resource element groups (REGs). The format of the PDCCH and the number of available bits of the PDCCH are determined depending on the number of CCEs. The base station determines a PDCCH format depending on the DCI which will be transmitted to the user equipment, and attaches cyclic redundancy check (CRC) to the control information. The CRC is masked with an identifier (for example, radio network temporary identifier (RNTI)) depending on usage of the PDCCH or owner of the PDCCH. For example, if the PDCCH is for a specific user equipment, the CRC may be masked with cell-RNTI (C-RNTI) of the corresponding user equipment. If the PDCCH is for a paging message, the CRC may be masked with a paging identifier (for example, paging-RNTI (P-RNTI)). If the PDCCH is for system information (in more detail, system information block (SIB)), the CRC may be masked with system information RNTI (SI-RNTI). If the PDCCH is for a random access response, the CRC may be masked with a random access RNTI (RA-RNTI).

Figure 7:
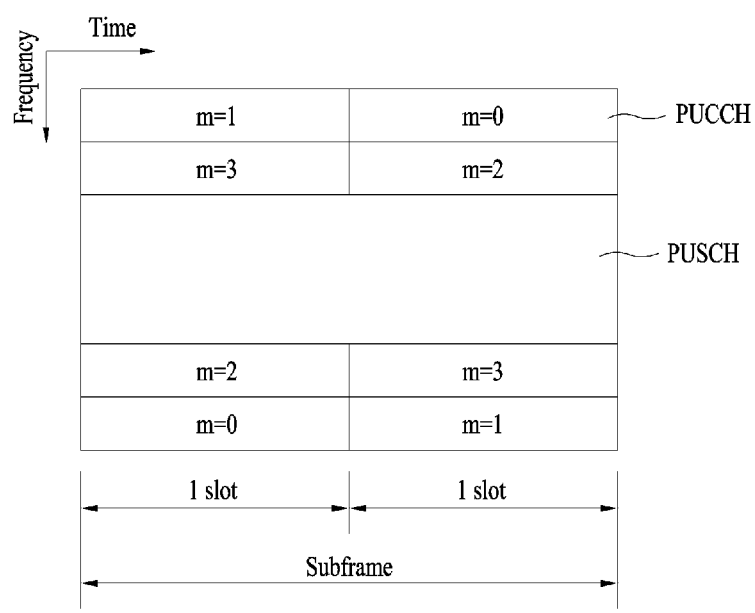
FIG. 7 is a diagram for a structure of an uplink subframe used in LTE.

FIG. 7 is a diagram for a structure of an uplink subframe used in LTE.

Referring to FIG. 7, an uplink subframe includes a plurality (e.g., 2 slots) of slots. Each of the slots may include a different number of SC-FDMA symbols depending on a length of CP. The UL subframe may be divided into a data region and a control region in frequency domain. The data region includes PUSCH and is used to transmit such a data signal as audio and the like. The control region includes PUCCH and is used to transmit UCI (uplink control information). The PUCCH includes an RB pair located at both ends of the data region on a frequency axis and is hopped on a slot boundary.

The PUCCH can be used to transmit the following control information.

SR (scheduling request): This is information used to request a UL-SCH resource and is transmitted using an OOK (on-off keying) scheme.

HARQ ACK/NACK: This is a response signal in response to a DL data packet on PDSCH and indicates whether the DL data packet has been successfully received. A 1-bit ACK/NACK is transmitted as a response to a single downlink codeword and a 2-bit ACK/NACK is transmitted as a response to two downlink codewords.

CSI (channel state information): This is feedback information on a downlink channel. The CSI includes a channel quality indicator (CQI). MIMO (multiple input multiple output) related feedback information includes a rank indicator (RI), a precoding matrix indicator, a precoding type indicator (PTI) and the like. 20-bit is used in each subframe.

The amount of a control information (UCI) that a user equipment can transmit in a subframe depends on the number of SC-FDMA symbols available for a transmission of the control information. The SC-FDMA symbols available for the transmission of the control information correspond to the rest of SC-FDMA symbols except SC-FDMA symbols used for transmitting a reference signal in the subframe. In case of a subframe in which a sounding reference signal (SRS) is configured, the last SC-FDMA symbol of the subframe is excluded from the SC-FDMA symbols available for the transmission of the control information. A reference signal is used for coherent detection of PUCCH.

Hereinafter, CoMP (cooperative multipoint transmission/reception) will be described.

A system appearing after LTE-A has attempted to introduce a scheme of enhancing system performance by enabling a plurality of cells to cooperate with each other. Such a scheme is called a cooperative multipoint transmission/reception (hereinafter abbreviated CoMP). The CoMP refers to a scheme for two or more base stations, access points, or cells to cooperatively communicate with a specific user equipment for smooth communication between the user equipment and the base stations, the access points, or the cells. In the present invention, a base station, an access point, and a cell may have the same meaning.

In general, in a multi-cell environment having a frequency reuse factor set to 1, performance and average sector throughput of a user equipment located at a cell boundary may be lowered due to inter-cell interference (ICI). In order to reduce the ICI, a conventional LTE system has applied a method of providing an appropriate throughput performance to a user equipment located at a cell boundary in an environment restricted by interference using a simple manual scheme such as FFR (fractional frequency reuse) through UE-specific power control. However, reduction of the ICI or reuse of the ICI as a signal desired by a user equipment may be more preferable than lowering a frequency resource use per cell. In order to achieve the aforementioned purpose, the CoMP transmission scheme can be applied.

Figure 8:
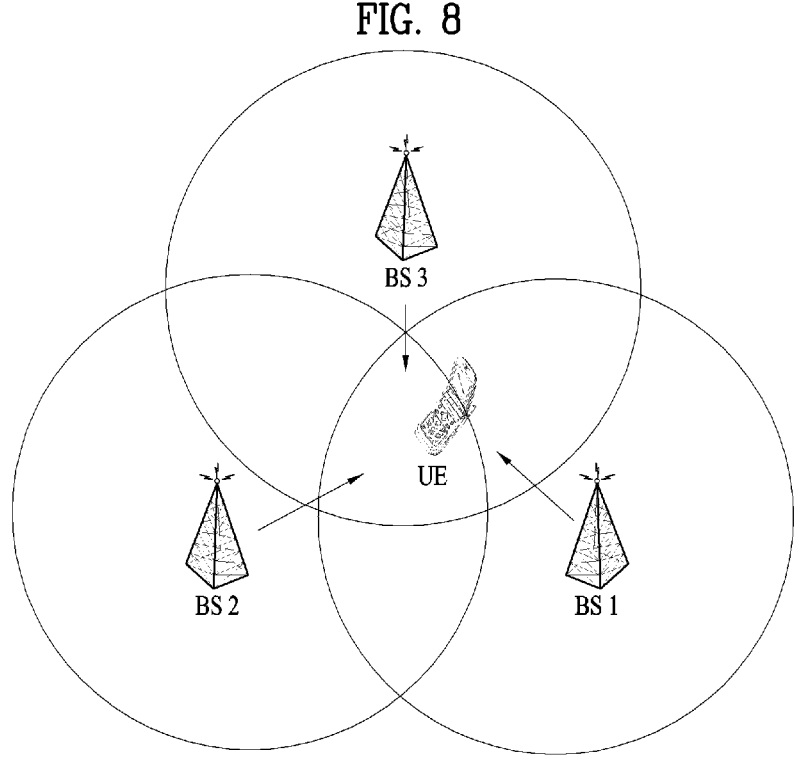
FIG. 8 is a diagram for one example of performing CoMP.

FIG. 8 is a diagram for one example of performing CoMP. Referring to FIG. 8, a wireless communication system includes a plurality of base stations (BS 1, BS 2 and BS 3) performing CoMP and a user equipment. A plurality of the base stations (BS 1, BS 2 and BS 3) performing the CoMP may efficiently transmit data to the user equipment by cooperating with each other. The CoMP may be mainly divided into two schemes according to whether data is transmitted from respective the base stations performing the CoMP:

Joint processing (CoMP joint processing (CoMP-JP))
  Cooperative scheduling/beam forming (CoMP cooperative scheduling/beamforming (CoMP-CS/CB))

In case of the CoMP-JP, data is simultaneously transmitted from respective base stations performing the CoMP to one user equipment and the user equipment combines signals from the respective base stations to improve reception performance. In particular, according to the CoMP-JP scheme, each point (e.g., base station) of CoMP cooperation unit may use data. And, the CoMP cooperation unit may mean a set of base stations used for cooperative transmission scheme. Moreover, the JP scheme may be classified into a joint transmission scheme and a dynamic cell selection scheme.

The joint transmission scheme means a scheme of transmitting PDSCH from a plurality of points (portion or all of CoMP cooperation unit) at a time. In particular, data transmitted to a single user equipment may be simultaneously transmitted from a plurality of transmission points. According to the joint transmission scheme, a quality of a received signal may be coherently or non-coherently improved and interference on another user equipment may be actively eliminated as well.

The dynamic cell selection scheme may mean the scheme of transmitting PDSCH from one point (of CoMP cooperation unit) at a time. In particular, data transmitted to a single user equipment at a specific timing is transmitted from one point, the rest of points in the cooperation unit at that timing do not perform data transmission to the corresponding user equipment, and a point of transmitting data to the corresponding user equipment may be dynamically selected.

Meanwhile, in case of the CoMP-CS, data is transmitted from one base station to one user equipment at a random timing and scheduling or beamforming is performed in order to minimize interference caused by other base stations. In particular, according to the CoMP-CS/CB scheme, CoMP cooperation units are able to cooperatively perform beamforming of data transmission to a single user equipment. In this case, although the data is transmitted from a serving cell only, user scheduling/beamforming may be determined by the coordination of cells of the corresponding CoMP cooperation unit.

Meanwhile, in case of uplink, coordinated multi-point reception means that a signal transmitted by coordination of a plurality of points geographically spaced apart from each other is received. CoMP schemes applicable to a case of uplink may be classified into joint reception (JR) and coordinated scheduling/coordinated beamforming (CS/CB).

The JR scheme means that a signal transmitted on PUSCH is received by a plurality of reception points. And, the CS/CB scheme means that user scheduling/beamforming is determined by the coordination of the cells of the CoMP cooperation unit despite that PUSCH is received by one point only.

Hereinafter, interference between many cells is described.

If a part of coverages of two base stations is overlapped with each other like a case that two base stations (e.g., base station #1 and base station #2) are arranged in a manner of being adjacent to each other, a strong DL signal from one base station may cause interference to a user equipment served by another base station. In case that inter-cell interference is generated, the inter-cell interference can be reduced through an inter-cell cooperation signal scheme between the two base stations. In the various embodiments of the present invention that will be described later, it is assumed that a signal is smoothly transceived between two base stations which interfere in each other. For instance, it is assumed that a wired/wireless link (e.g., backhaul link or Un interface) having satisfactory transmission conditions such as transmission bandwidth, time delay and the like is present between the two base stations so that reliability of transmission and reception of a cooperative signal between two base stations is high. In addition, it is assumed that time synchronization between the two base stations is matched with each other within an allowable error range (e.g., a case that boundaries of downlink subframes of the two base stations interfering in each other are aligned) or a difference (offset) between subframe boundaries of the two base stations is clearly recognized by the two base stations.

Referring back to FIG. 8, a base station #1 (BS #1) may be a macro base station that serves a wide area with high transmission power and a base station #2 (BS #2) may be a micro base station (e.g., pico base station) that serves a narrow area with low transmission power. As shown in FIG. 8, when the base station #1 causes strong interference to a user equipment located at a cell boundary of the base station #2 and served by the base station #2, it may be difficult to perform efficient communication without appropriate inter-cell cooperation.

In particular, when a large number of user equipments are connected to the base station #2 corresponding to the micro base station having low power in order to distribute a load of the base station #1 corresponding to the macro base station providing a service, it is highly probable that the above-mentioned inter-cell interference occurs. For instance, when a user equipment intends to select a serving base station, the user equipment can calculate and compare each of reception powers of DL signals from base stations by adding a prescribed adjustment value (bias value) to reception power from the micro base station and adding no adjustment value to reception power from the macro base station. As a result, the user can select a base station that provides highest DL reception power as the serving base station. Thus, a larger number of user equipments can be connected to the micro base station. Even though strength of the DL signal actually received by the user equipment from the macro base station is much higher than the strength of the DL signal from the micro base station, the micro base station can be selected as the serving base station. And, the macro base station may cause the strong interference to the user equipment connected to the micro base station. In this case, if a separate inter-cell cooperation is not provided, it may be difficult for user equipments located at the boundary of the micro base station to perform correct operations due to the strong interference from the macro base station.

Even if the inter-cell interference exists, appropriate cooperation needs to be achieved between two base stations interfering in each other in order to perform an efficient operation. And, a signal enabling the cooperation can be transceived in a link between the two base stations. In this case, if the inter-cell interference occurs between a macro base station and a micro base station, the macro base station may control inter-cell cooperation and the micro base station may perform an appropriate operation in accordance with a cooperative signal instructed by the macro base station.

The above mentioned inter-cell interference occurrence situation is just exemplary. And, it is apparent that the embodiments of the present invention can be identically applicable to a case of the inter-cell interference generated in a different situation (e.g., a case of the inter-cell interference occurs between a CSG type of HeNB and an OSG type of a macro base station, a case that a micro base station causes the ICI to a macro base station, a case that the ICI is present between micro base stations or between macro base stations, or the like).

According to the present invention, in order for a cell and a user equipment to perform various measurement operations accurately, proposed is a method for a number of cells to efficiently change usages of radio resources in accordance with system load statuses of their own. In this case, for example, the various measurement operations includes operations of estimating and reporting a channel state information (CSI), an interference information, a radio link monitoring (RLM) information, a radio resource monitoring (RRM) information and the like.

For clarity, the present invention is explained based on 3GPP LTE system in the following description. However, the scope of the system to which the present invention is applicable can be extended to other systems as well as the 3GPP LTE system.

The embodiment of the present invention can be extensively applied to a case of dynamically changing a resource on a specific cell or a specific component carrier (CC) according to a system load state in an environment to which carrier aggregation (CA) is applied. Moreover, the embodiments of the present invention can be extensively applied to a case of dynamically changing a usage of a radio resource in TDD system or FDD system.

In the present invention, an information related to a channel state estimation process (CSI process) means an information provided to a user equipment by a cell to estimate a channel state between a specific cell and a user equipment. For example, the corresponding information may include a type, configuration, periodicity or subframe offset of a reference signal used for channel state estimation, a virtual cell ID or physical cell ID for generation of a sequence of a reference signal, an interference measurement resource (IMR) and the like.

Moreover, an information related to the interference measurement resource (IMR) means a resource provided to a user equipment by a cell for the purpose of efficiently measuring external interference received from communication between a specific cell and a user equipment. For example, the corresponding interference measurement resource may be defined based on one of i) a resource unit, ii) a configuration, iii) a periodicity and iv) a subframe offset, which are defined in advance.

Furthermore, an information related to resource-specific channel state information measurement (resource-specific CSI measurement or restricted CSI measurement) means an information provided to a user equipment by a cell in order to perform operations of estimating an independent channel state (or estimating interference) and reporting the independent channel state on each set of radio resources having different interference characteristics. For instance, such a resource-specific channel state information may include an information on the set of the radio resources having the different interference characteristics, a configuration information (e.g., channel state reporting period/subframe offset/ uplink resource index etc.) for reporting the independent channel state of each set of the radio resources having the different interference characteristics and the like.

In the following description, assume a situation that each cell dynamically changes a usage of an existing radio resource in accordance with its system load state in a TDD system environment for clarity of the present invention.

Figure 9:
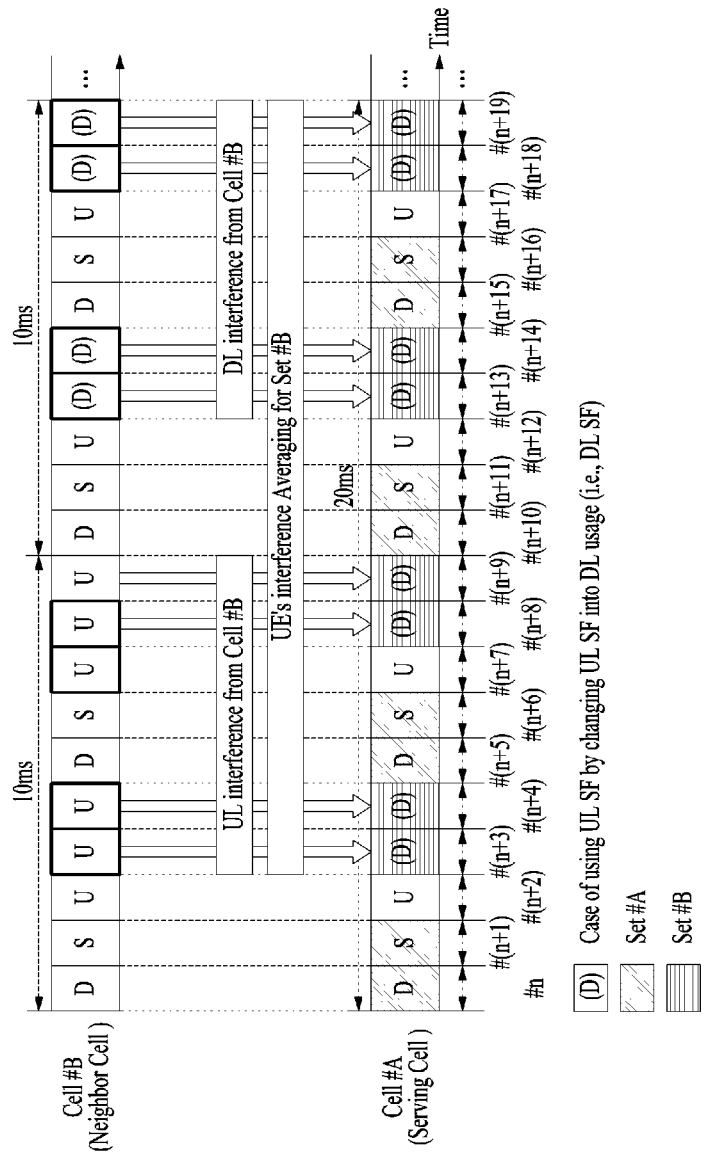
FIG. 9 is a diagram of a case for user equipments in a specific cell to fail in performing an accurate interference measurement/channel state measurement when the corresponding cell does not know informations on dynamic changes of uses of radio resources of neighbor cells.

FIG. 9 is a diagram of an example for user equipments in a specific cell to fail in performing an accurate interference measurement/channel state measurement when the corresponding cell does not know informations on dynamic changes of radio resource usages of neighbor cells. In this case, an information on a dynamic change of a radio resource usage may include i) dynamic change period information and/or ii) usage information of radio resource and/or iii) power configuration information.

In FIG. 9, for clarity, assume a situation that two cells (i.e., cell #A and cell #B) exist on TDD system network. A UL/DL configuration configured by SIB of each of cells is assumed to be UL/DL #0 (i.e., DSUUUDSUUU). And, a dynamic change period of cell #A and a dynamic change period of cell #B are set to 20 ms and 10 ms, respectively and assume a situation that the cell #A does not know an information on a dynamic change of a radio resource usage of the cell #B.

Therefore, in FIG. 9, the cell #A cannot accurately inform its user equipment of informations on resource sets having fixed interference properties. Assume that the cell #A informs its user equipment of the resource sets having the fixed interference properties by arbitrarily dividing the resource sets having the fixed interference properties into a conventional downlink usage of a subframe set (i.e., set #A) and a changed usage of a uplink subframe set (i.e., set #B).

Thus, the user equipment can independently perform an interference measuring operation or an interference averaging operation on each of the resource sets using the informations on the resource sets having the fixed interference properties. However, due to different dynamic change periods between the cells, it can be aware that interference properties received on the changed usage of the uplink subframe set (i.e. set #B) are irregular.

In particular, the interference properties received on the changed usage of the uplink subframe set of the cell #A have been changed from interference caused by uplink communication of the cell #B into interference caused by downlink communication of the cell #B. However, since the cell #A does not know the information on the dynamic change of the radio resource usage of the cell #B, the cell #A cannot rapidly inform its user equipment of an accurate information (or indication) related to interference measurement/channel state measurement in which the changed interference environment is reflected. Moreover, a user equipment performing communication with the cell #A averages every interference of irregular characteristics received on the changed usage of the uplink subframe set, calculates an inaccurate interference estimation value for the corresponding set, and then calculates an inaccurate channel state information (e.g., CQI, PMI or RI) for the changed usage of the uplink subframe set based on the corresponding interference estimation value (i.e., restricted CSI measurement or resource-specific CSI measurement). Finally, the user equipment transmits the inaccurate channel state information to cell based on predefined parameters (e.g., period/subframe offset/uplink resource index, etc.) related to channel state report for the changed usage of the uplink subframe set.

Therefore, according to the present invention, in order for a cell and a user equipment to perform various measurement operations efficiently, proposed is a method for a number of cells to change radio resource usages of their own based on informations related to dynamic changes discussed (or defined) in advance.

In this case, informations related to the dynamic changes previously discussed (or defined) may include i) dynamic change period information and/or ii) usage information of radio resource and/or iii) power configuration information. Moreover, in order for a number of cells to discuss (or define) the informations related to the dynamic changes, a number of the cells may exchange informations such as i) uplink/downlink load statuses of their own and/or ii) preferred dynamic change period and/or iii) preferred radio resource usage configuration and/or iv) physical identifier or virtual identifier through a predefined channel (e.g., a wired/wireless channel or an X2 interface).

According to an embodiment of the present invention, it can be configured that a number of cells change radio resource usages of their own based on a dynamic change period previously discussed (or defined). In particular, the present embodiment proposes that timings of dynamic changes of radio resource usages of a number of cells are synchronized (or harmonized). Thus, interference properties can be consistently maintained between cells during at least a dynamic change period previously discussed (or defined).

According to the present proposed method, a starting point (or reference point) of the dynamic change period can be configured as a subframe of a specific timing (or location) defined through a discussion between cells. In this case, although a radio frame/subframe index of a specific subframe for the starting point of the dynamic change period per cell may be set identical, the radio frame/subframe index of the specific subframe for the starting point of the dynamic change period per cell may be set different due to a time offset (or subframe offset) existing between the cells.

Moreover, in case of applying the present invention, a time window for performing an interference averaging operation of a user equipment can be set equal to the dynamic change period discussed (or defined) in advance. In particular, since the cells are unable to change the usages of the radio resources during the dynamic change period, the dynamic change period may be considered as a time region for which the interference properties between the cells are maintained. Therefore, a limited interference averaging operation in a dynamic change period window and an interference averaging value calculated from the corresponding interference averaging operation may be considered valid only. Moreover, since an interference averaging value calculated from a previous dynamic change period does not reflect a changed state of a radio resource updated per cell on a later dynamic change period, the interference averaging value calculated from the previous dynamic change period may be configured to be discarded. And, the user equipment can newly perform the interference averaging operation during the later dynamic change period.

Furthermore, a cell can inform a user equipment of i) dynamic change period information and/or ii) information on starting point of dynamic change period and/or iii) information on time window for performing interference averaging operation and/or iv) information related to a discarding (or renewing) point of interference averaging value. Alternatively, the user equipment may be configured to implicitly obtain the above-mentioned informations based on a predefined configuration. Such a notification of the dynamic change period information and/or the information on the starting point of the dynamic change period discussed (or defined) between a number of cells, which is delivered from the cell to the user equipment, may be considered as a notification of 'information on time region for which inter-cell interference properties are maintained' from the cell to the corresponding user equipment. In addition, the present embodiment may be extensively applied to a situation that a number of cells shares informations on dynamically changed usages of radio resource with each other.

Figure 10:
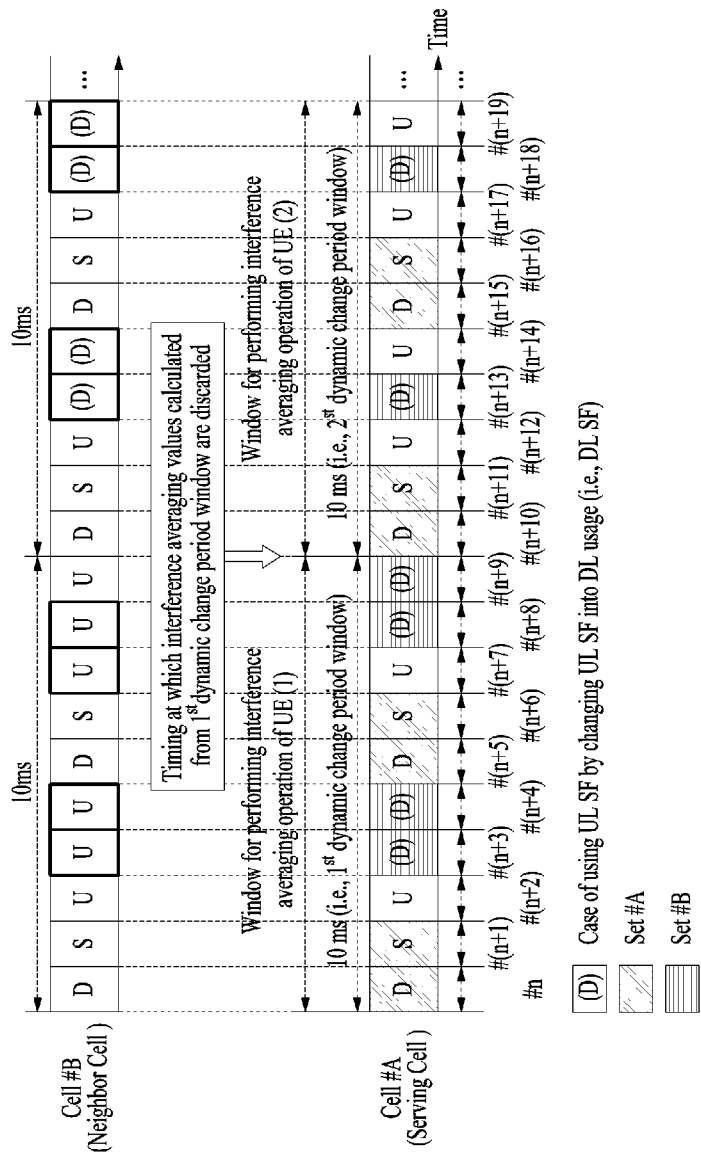
FIG. 10 is a diagram of a case for a number of cells to change radio resource usages of their own based on a dynamic change period discussed (or defined) in advance according to an embodiment of the present invention.

FIG. 10 is a diagram of an example for a number of cells to change radio resource usages of their own based on a dynamic change period discussed (or defined) in advance according to an embodiment of the present invention.

In FIG. 10, for clarity, assume a situation that two cells (i.e., cell #A and cell #B) exist on TDD system network. A UL/DL configuration configured by SIB of each of cells is assumed to be UL/DL #0 (i.e., DSUUUDSUUU). Moreover, in FIG. 10, assume that a dynamic change period discussed (or defined) in advance is 10 ms and radio frame/subframe indices of starting points of dynamic change periods of the cell #A and the cell #B are equal to each other.

For instance, a time window for performing an interference averaging operation of a user equipment performing communication with the cell #A is configured to be identical to the dynamic change period (i.e., 10 ms). And, an interference averaging value calculated from a previous dynamic change period window may be assumed not to be used for a later dynamic change period window but to be discarded. In this case, it is assumed that the cell #A divides respective resource sets having different interference characteristics in a $1^{st}$ dynamic change period window, for which interference properties between cells are maintained, into a conventional downlink usage of a subframe set (i.e., set #A) and a changed usage of a uplink subframe set (i.e., set #B) and then informs its user of the corresponding resource sets having different interference characteristics in the $1^{st}$ dynamic change period window.

In this case, the user equipment independently performs interference averaging operation/operations of generating and reporting a channel state information (i.e., restricted CSI measurement or resource-specific CSI measurement) on each of subframe sets using informations on the subframe sets having different interference characteristics in the $1^{st}$ dynamic change period received from the cell #A. Furthermore, if a $2^{nd}$ dynamic change period starts, the user equipment discards the interference averaging value (of each of the subframe sets having the different interference characteristics) calculated from the dynamic change period window.

After the above-mentioned process, the user equipment independently performs (new) interference averaging operation/operations of generating and reporting the channel state information (i.e., restricted CSI measurement or resource-specific CSI measurement) on each of subframe sets using informations on the subframe sets having different interference characteristics in the $2^{nd}$ dynamic change period (for which interference properties between the cells are maintained) received from the cell #A.

Therefore, according to the above-mentioned embodiment of the present invention, the user equipment can efficiently perform the interference averaging operation/operations of generating and reporting the channel state information on each of the resource sets having the different interference characteristics in the dynamic change period for which the interference properties between the cells are maintained.

Moreover, as mentioned in the foregoing description, if a number of cells change the radio resource usages of their own based on the dynamic change period discussed (or defined) in advance, a time window for performing the interference averaging operation of the user equipment can be configured to be identical to the dynamic change period discussed (or defined) in advance. In particular, since a number of the cells cannot perform the usage changes of the radio resources during the dynamic change period previously discussed (or defined), the interference properties between the cells can be maintained. In consideration of this aspect, a limited interference averaging operation in a corresponding dynamic change period window and an interference averaging value calculated from the corresponding interference averaging operation may be considered valid only.

According to another embodiment of the present invention, the interference averaging operation based on the dynamic change period discussed (or defined) previously may be configured in a manner of being limitedly applied to only a subframe set (i.e., a flexible subframe set) on which the dynamic change of the radio resource usage is performed. Moreover, the interference averaging operation based on the dynamic change period discussed (or defined) previously may be configured in a manner of being limitedly applied to a point (i.e., the point may be interpreted as a type of a flexible subframe) corresponding to an uplink subframe on SIB but having IMR (interference measurement resource) configured therein. Furthermore, in aspect of a specific cell, the flexible subframe set can be defined as i) a set of subframes on which the dynamic change of the radio resource usage is performed or ii) a set of subframes to which the dynamic changes of the radio resource usages are commonly applied by cells changing the radio resource usages of their own based on the dynamic change period discussed (or defined) in advance (i.e., intersection operation) or iii) a set of subframes to which the dynamic change of the radio resource usage is applied by at least one cell among cells changing the radio resource usages of their own based on the dynamic change period discussed (or defined) in advance (i.e., union operation).

In the following description, for clarity, assume a situation that a flexible subframe set is defined as a set of subframes on which dynamic changes of radio resource usages are performed. However, the present invention can be extensively applied to a case that the flexible subframe set is defined as at least one of the various methods mentioned in the foregoing description. In the present invention, the reason why the interference averaging operation based on the dynamic change period discussed (or defined) in advance is limitedly applied to only the flexible subframe set is that the dynamic change period discussed or defined previously has an effect on i) whether an interference measurement resource (IMR) configured on the corresponding flexible subframe set is valid and/or ii) whether an interference measurement value measured based on the corresponding interference measurement resource (IMR) is calculated based on identical interference properties and/or iii) whether the interference measurement value measured based on the corresponding interference measurement resource (IMR) can be reflected as the interference averaging operation (e.g., it is preferable that only interference measurement values calculated based on the identical interference properties are limitedly reflected).

In particular, although a UL/DL configuration of an interfering cell is maintained, if a serving cell changes a usage of a flexible subframe from DL communication into UL communication based on the dynamic change period discussed (or defined) in advance, the IMR (interference measurement resource) configured on the corresponding flexible subframe becomes invalid. Alternatively, although the serving cell maintains the UL/DL configuration, if the interfering cell changes the usage of the flexible subframe (e.g., changes from DL communication into UL communication or from UL communication into DL communication) based on the dynamic change period discussed (or defined) in advance, the identical interference properties on the flexible subframe configured for the purpose of DL communication of the serving cell are changed.

In particular, in aspect of the serving cell, the interference properties on the flexible subframe configured for the purpose of the DL communication during a previous dynamic change period and the interference properties on the flexible subframe configured for the purpose of the DL communication during a current dynamic change period become different from each other. And, it is not preferable that each of the interference measurement values calculated based on different interference properties is reflected as the interference averaging operation since it causes an inaccurate interference averaging operation and/or an operation of calculating an inaccurate interference averaging value. Moreover, if a specific user equipment fails in successfully receiving a radio resource usage change information of the serving cell or a usage configuration information of the flexible subframe (e.g., reconfiguration message), an error in determining whether the interference measurement resource (IMR) configured on the flexible subframe is valid may occur in aspect of the corresponding user equipment. However, the interference averaging operation based on the dynamic change period previously discussed (or defined) can mitigate a problem that the inaccurate interference averaging operation and/or the operation of calculating the inaccurate interference averaging value generated from the error are maintained for many dynamic change periods (or a long time).

According to another embodiment of the present invention, a time window (interfere averaging time window) for performing the interference averaging operation on a DL subframe set configured as a static usage may be defined as a relatively greater value (or long time window) than the case of the flexible subframe. For instance, the interference measurement resource for the DL subframe set configured as the static usage and the interference measurement resource for the flexible subframe set may be configured based on independent parameters (e.g., period information, subframe offset information, location information on time/frequency resource (for example, 4 port CSI-RS configuration index), etc.) respectively or common parameters. Alternatively, the time window (interfere averaging time window) for performing the interference averaging operation on the downlink subframe set (e.g., subframe #0/1/5/6 of TDD system or subframe #0/4/5/9 of FDD system), to which the dynamic change of the radio resource usage is not applied, may be defined as a relatively greater value (or long time window) than the case of the flexible subframe. For instance, the interference measurement resource for the DL subframe set to which the dynamic change of the radio resource usage is not applied and the interference measurement resource for the flexible subframe may be configured based on independent parameters (e.g., period information, subframe offset information, location information on time/frequency resource (for example, 4 port CSI-RS configuration index), etc.) respectively or common parameters.

Moreover, the time window (interfere averaging time window) for performing the interference averaging operation on interference measurement based on the interference measurement resource (IMR) configured on the DL subframe set of the static usage may be configured not to designated i) before dynamic change operation of radio resource usage is configured or ii) before the dynamic change operation of the radio resource usage is actually applied or iii) before a message (predefined) related to a configuration of dynamic change operation of the radio resource usage is received. For instance, the time window (interfere averaging time window) for performing the interference averaging operation on the interference measurement based on the interference measurement resource (IMR) configured on the downlink subframe set (of the static usage) may be defined as infinite (i.e., unrestricted interfere averaging time window or unrestricted measurement) before the dynamic change operation of the radio resource usage is configured. Alternatively, the time window for performing the interference averaging operation on the interference measurement based on the interference measurement resource (IMR) configured on the downlink subframe set (of the static usage) may be defined as infinite (i.e., unrestricted interfere averaging time window or unrestricted measurement) before the dynamic change operation of the radio resource usage is actually applied or before the (predefined) message related to the configuration of the dynamic change operation of the radio resource usage is received.

Furthermore, a base station can inform a user equipment of an information (and/or an information on a configuration of the present embodiment) on whether to apply the embodiment of the present invention related to the time window for performing the interference averaging operation through a predefined signal (e.g., physical layer or upper layer signal). Alternatively, the user equipment may be configured to implicitly obtain the corresponding information based on a predefined rule.

For another example, the time window for performing the interference averaging operation on the interference measurement based on the interference measurement resource (IMR) configured on the predefined downlink subframe set configured as the static usage may be defined as infinite (i.e., unrestricted interfere averaging time window or unrestricted measurement) i) after the dynamic change operation of the radio resource usage is configured or ii) after the dynamic change operation of the radio resource usage is actually applied or iii) after the (predefined) message related to the configuration of the dynamic change operation of the radio resource usage is received as well. Likewise, the time window for performing the interference averaging operation on the interference measurement based on the interference measurement resource (IMR) configured on the predefined downlink subframe set, to which the dynamic change operation of the radio resource usage is not applied, may be defined as infinite (i.e., unrestricted interfere averaging time window or unrestricted measurement) i) after the dynamic change operation of the radio resource usage is configured or ii) after the dynamic change operation of the radio resource usage is actually applied or iii) after the (predefined) message related to the configuration of the dynamic change operation of the radio resource usage is received as well. For instance, the time window for performing the interference averaging operation, which is defined as infinite, may be limited to subframe #0/1/5/6 of TDD system or subframe #0/4/5/9 of FDD system (i.e., downlink subframe set difficult to apply the dynamic change operation of the radio resource usage due to transmission of system information (e.g., SIB/PBCH/PAGING)).

Moreover, the above-mentioned embodiments of the present invention may be configured to be limitedly applied to a case that the dynamic change operation of the radio resource usage is configured only. Furthermore, a specific cell can inform user equipments performing communication with the specific cell or neighbor cells participating in cooperative communication of an information on whether the dynamic change operation of the radio resource usage is configured through a predefined signal (e.g., i) physical layer signal or ii) upper layer signal (e.g., RRC/MAC) or iii) channel for transporting system information (e.g., SIB/PBCH (MIB)/Paging) or iv) X2 interface).

According to another embodiment of the present invention, a serving cell may be configured to inform user equipments performing communication with the serving cell of an information on a subframe for performing the dynamic change of the radio resource usage through predefined signal in a manner that neighbor cells designate a random downlink subframe among downlink subframes configured as the static usage in a relation with the corresponding serving cell as the flexible subframe. In this case, the above-mentioned information may be configured to be transmitted to a user equipment by a base station together with a configuration information on the time window (interference averaging time window) for performing the interference averaging operation on the interference measurement based on the interference measurement resource (IMR) configured on downlink subframes configured as the static usage. Although the serving cell uses a specific subframe as a static downlink usage, this embodiment of the present invention may be valid in the following situation. The interference properties on corresponding static downlink subframe are changed depending on as which usage a neighbor cell uses the corresponding subframe (or whether the corresponding subframe is configured as the flexible subframe).

Moreover, the above embodiment of the present invention may be configured to be limitedly applied to only a situation i) before the dynamic change operation of the radio resource usage is configured or ii) before the dynamic change operation of the radio resource usage is actually applied or iii) before the (predefined) message related to the configuration of the dynamic change operation of the radio resource usage is received. Alternatively, the above embodiment may be configured to be limitedly applied to only a situation iv) after the dynamic change operation of the radio resource usage is configured or v) after the dynamic change operation of the radio resource usage is actually applied or vi) after the (predefined) message related to the configuration of the dynamic change operation of the radio resource usage is received. Further, the above embodiment may be configured to be applied at all times irrespective of vii) whether the dynamic change operation of the radio resource use is configured or viii) whether the dynamic change operation of the radio resource usage is actually applied or ix) whether the (predefined) message related to the configuration of the dynamic change operation of the radio resource usage is received.

In addition, a base station can inform a user equipment of an information (and/or configuration information related to the embodiment of the present invention) on whether to apply the embodiment of the present invention through a predefined signal (e.g., physical layer or upper layer signal). Alternatively, the user equipment may be configured to implicitly obtain the corresponding information based on a predefined rule.

According to another embodiment of the present invention, a serving cell may be configured to inform user equipments performing communication with the serving cell of i) a configuration information on a size (interfere averaging time window size) of the time window for performing the interference averaging operation per the interference measurement resource (IMR) or ii) a configuration information on a time window region for performing the interference averaging operation per the interference measurement resource (IMR) through the predefined signal.

For instance, in aspect of time-resource domain, if resource-specific channel state information measurement (resource-specific CSI measurement or restricted CSI measurement) is configured, each of configuration informations on the size (interfere averaging time window size) of the time window for performing the interference averaging operation per subframe set (configured for resource-specific measurement or restricted CSI measurement) may be configured to be independently defined regarding one specific interference measurement resource (IMR) as well. Alternatively, in aspect of the time-resource domain, if the resource-specific channel state information measurement (resource-specific CSI measurement or restricted CSI measurement) is configured, each of the configuration informations on the time window region for performing the interference averaging operation per subframe set (configured for resource-specific measurement or configured for restricted CSI measurement) may be configured to be independently defined regarding one specific interference measurement resource (IMR) as well.

In this case, an information related to the resource-specific channel state information measurement (resource-specific CSI measurement or restricted CSI measurement) means an information provided to a user equipment by a cell in order to perform operations of estimating an independent channel state (or estimating interference) and reporting the independent channel state on each of radio resource sets (e.g., resource sets on time/frequency domain) having different interference characteristics. Therefore, the information related to the resource-specific channel state information measurement may include i) information on the radio resource sets having the different characteristics and ii) configuration information (e.g., channel state reporting period/subframe offset/uplink resource index etc.) for reporting the independent channel state for each of the radio resource sets having the different interference characteristics.

Moreover, the embodiment of the present invention regarding configuration information related to the time window for performing the interference averaging operation per the interference measurement resource (IMR) may be configured to be limitedly applied to i) downlink subframes configured as static usage and/or ii) flexible subframes and/or iii) downlink subframes configured as static usage in aspect of serving cell and/or iv) subframes designated as flexible subframes by neighbor cells and/or v) all subframes configured as downlink usage in aspect of serving cell only.

For instance, the above embodiment may be configured to be limitedly applied to only a situation i) before the dynamic change operation of the radio resource usage is configured or ii) before the dynamic change operation of the radio resource usage is actually applied or iii) before the (predefined) message related to the configuration of the dynamic change operation of the radio resource usage is received. Alternatively, it may be configured to be limitedly applied to only a situation iv) after the dynamic change operation of the radio resource usage is configured or v) after the dynamic change operation of the radio resource usage is actually applied or vi) after the (predefined) message related to the configuration of the dynamic change operation of the radio resource usage is received. Moreover, it may be configured to be applied at all times irrespective of vii) whether the dynamic change operation of the radio resource usage is configured or viii) whether the dynamic change operation of the radio resource usage is actually applied or ix) whether the configuration of the dynamic change operation of the radio resource usage is related (the predefined message is received). Furthermore, a base station can inform a user equipment of an information (and/or an information on a configuration of the embodiment of the present invention) on whether to apply the embodiment of the present invention through a predefined signal (e.g., physical layer or upper layer signal). Alternatively, the user equipment may be configured to implicitly obtain the corresponding information based on a predefined rule.

In addition, at least one of a) a method of defining the configuration information on the size of the time window for performing the interference averaging operation per the interference measurement resource, b) a method of defining the configuration information on the time window region for performing the interference averaging operation per the interference measurement resource, c) a method of independently defining each of configuration informations on the size of the time window for performing the interference averaging operation per subframe set configured for resource-specific channel state information measurement (resource-specific CSI measurement or restricted CSI measurement) regarding one specific interference measurement resource as well in case of the resource-specific channel state information measurement (resource-specific CSI measurement or restricted CSI measurement) configured in aspect of the time-resource domain, and d) a method of independently defining each of configuration informations on the time window region for performing the interference averaging operation per subframe set configured for resource-specific channel state information measurement (resource-specific CSI measurement or restricted CSI measurement) regarding one specific interference measurement resource as well in case of the resource-specific channel state information measurement (resource-specific CSI measurement or restricted CSI measurement) configured in aspect of the time-resource domain may be considered or interpreted that a base station informs a user equipment of configuration information (or configuration information on the time window region for performing the interference averaging operation) on the size of the time window for performing the interference averaging operation i) per CSI process and/or ii) per measurement subset and/or iii) per measurement subset interconnected with each CSI process through predefined signal (e.g., physical layer or upper layer signal).

In this case, an information related to a channel state estimation process (CSI process) means an information that a cell provides a user equipment in order to estimate a channel state between a specific cell and a user equipment. For example, the information related to the channel state estimation process may include a type, configuration, periodicity or subframe offset of a reference signal used for channel state estimation, a virtual cell ID or physical cell ID for generation of a sequence of a reference signal, an interference measurement resource (IMR), an information on whether to apply resource-specific CSI measurement or restricted CSI measurement, and/or an information related to resource-specific CSI measurement or restricted CSI measurement (e.g., information on radio resource sets having different characteristics and configuration information for reporting an independent channel state of each of radio resource sets having different interference characteristics).

According to further embodiment of the present invention, if a number of cells change the radio resource usages of their own based on the dynamic change period discussed (or defined) in advance (e.g., if timings of the dynamic changes of the radio resource usage of a number of cells are synchronized (or harmonized)), RLM (radio link monitoring) and RRM (radio resource monitoring) related operations of a user equipment may be configured to be performed in consideration of the corresponding dynamic change period.

In particular, all measurement values related to RLM/RRM of a user equipment performing communication with a specific cell are affected by external interference. If the amount of the external interference is increased relatively (or signal strength of a neighbor cell is increased), radio link failure (RLF) announcement/handover operation may be performed in accordance with a predefined rule. Thus, a configuration of a downlink subframe set for performing RLM/RRM operation of the user equipment may be configured to be changed per dynamic change period window (or a time window constructed with the predefined number of the dynamic change periods) for which inter-cell interference properties are maintained.

In this case, a downlink subframe set for performing RLM/RRM operation of a specific user equipment may i) be constructed with downlink subframes used for a relatively static usage by a serving cell of the corresponding user equipment or ii) be constructed with downlink subframes to which the dynamic change operation is not applied or iii) be limited to downlink subframes having the fixed properties of interference received from a neighbor cell among the downlink subframes used for the relatively static usage. Moreover, a cell can inform a user equipment of informations related to it through a predefined signal (e.g., physical layer or upper layer signal). Alternatively, the user equipment may be configured to implicitly obtain the corresponding informations based on a predefined rule.

Moreover, RLM/RRM related values calculated from a downlink subframe set configured on a previous dynamic change period window (or a previous time window constructed with the predefined number of the dynamic change periods) may be configured not to be used for a later dynamic change period window (or a later time window constructed with the predefined number of the dynamic change periods) but to be discarded. In this case, it may be valid since it is highly probable that interference properties on the previous dynamic change period window and interference properties on the later dynamic change period window are different from each other. Thus, RLM/RRM related estimation values (or RLM/RRM related states) can be newly updated in each dynamic change period window.

Since the examples of the proposed schemes mentioned in the above description can be included as one of methods for implementing the present invention as well, it is apparent that the examples of the proposed schemes are considered as types of the proposed schemes. Moreover, it may be able to implement the above mentioned proposed schemes not only independently but also by combining (or merging) the proposed schemes together in part. Furthermore, the above-mentioned embodiments of the present invention may be configured to be limitedly applied to i) a case that a change mode of a radio resource usage is configured and/or ii) a case of an aperiodic CSI reporting operation and/or iii) a case of a periodic CSI reporting operation only.

Figure 11:
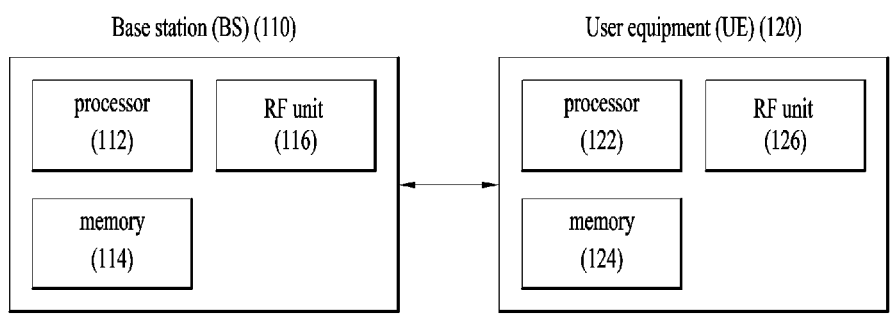
FIG. 11 is a diagram for an example of a base station and a user equipment applicable to an embodiment of the present invention.

FIG. 11 is a diagram for examples of a base station and a user equipment applicable to an embodiment of the present invention. If a relay node is included in a wireless communication system, a communication in backhaul link is performed between a base station and the relay node and a communication in access link is performed between the relay node and a user equipment. Therefore, the base station or user equipment shown in the drawing can be substituted with the relay node in some cases.

Referring to FIG. 11, a wireless communication system includes a base station BS 110 and a user equipment UE 120. The base station 110 includes a processor 112, a memory 114 and an RF (radio frequency) unit 116. The processor 112 can be configured to implement the procedures and/or methods proposed by the present invention. The memory 114 is connected to the processor 112 and stores various kinds of informations related to operations of the processor 112. The RF unit 116 is connected to the processor 112 and transmits and/or receives radio or wireless signals. The user equipment 120 includes a processor 122, a memory 124 and an RF unit 126. The processor 122 can be configured to implement the procedures and/or methods proposed by the present invention. The memory 124 is connected to the processor 122 and stores various kinds of informations related to operations of the processor 122. The RF unit 126 is connected to the processor 122 and transmits and/or receives radio or wireless signals. The base station 110 and/or the user equipment 120 can have a single antenna or multiple antennas.

The above-described embodiments may correspond to combinations of elements and features of the present invention in prescribed forms. And, it may be able to consider that the respective elements or features may be selective unless they are explicitly mentioned. Each of the elements or features may be implemented in a form failing to be combined with other elements or features. Moreover, it may be able to implement an embodiment of the present invention by combining elements and/or features together in part. A sequence of operations explained for each embodiment of the present invention may be modified. Some configurations or features of one embodiment may be included in another embodiment or can be substituted for corresponding configurations or features of another embodiment. And, it is apparently understandable that a new embodiment may be configured by combining claims failing to have relation of explicit citation in the appended claims together or may be included as new claims by amendment after filing an application.

Embodiments of the present invention may be implemented using various means. For instance, embodiments of the present invention may be implemented using hardware, firmware, software and/or any combinations thereof. In case of the implementation by hardware, one embodiment of the present invention may be implemented by one of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, one embodiment of the present invention may be implemented by modules, procedures, and/or functions for performing the above-explained functions or operations. Software code may be stored in a memory unit and may be then drivable by a processor. The memory unit may be provided within or outside the processor to exchange data with the processor through the various means known to the public.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

INDUSTRIAL APPLICABILITY

Although a method for sharing a radio resource information in a wireless communication system and apparatus therefor are mainly described with reference to the examples of applying to 3GPP LTE system, as mentioned in the foregoing description, the present invention is applicable to various kinds of wireless communication systems as well as to the 3GPP LTE system.

What is claimed is:

1. A method of transceiving signals, by a user equipment in a multi-cell wireless communication system, the method comprising:
   initiating an interference measurement value before a predefined time window indicated by a radio resource control (RRC) signaling,
   wherein if a previous interference measurement value was derived in the predefined time window, the previous interference measurement value is discarded;
   calculating interference measurement values of each of resource sets having different interference characteristics for at least one of a serving cell and a neighbor cell in the predefined time window by performing a restricted channel state information measurement; and
   transmitting channel state information related with a specific radio resource based on an interference measurement value among the interference measurement values in the predefined time window,
   wherein the specific radio resource is configured to enable a usage of a radio resource to be changed within the predefined time window.

2. The method of claim 1, wherein an interference averaging window for the interference measurement value in the predefined time window is configured to be identical to the predefined time window.

3. The method of claim 1, wherein the interference measurement value in the predefined time window is configured to be calculated on only a subframe configured to enable a usage change of the radio resource to be allowed.

4. The method of claim 1, wherein the interference measurement value in the predefined time window is configured to be measured on only a subframe having an interference measurement resource (IMR) configured therein.

5. The method of claim 1. wherein the interference measurement value in the predefined time window is configured to be performed on only a subframe configured to enable a usage change of the radio resource to be allowed.

6. The method of claim 1, further comprising:
   receiving a configuration information on a size of the predefined time window for performing an interference averaging operation per interference measurement resource (IMR).

7. A user equipment, which transceives signals in a multi-cell wireless communication system, the user equipment comprising:
   a radio frequency unit; and
   a processor configured to:
      initiate an interference measurement value before a predefined time window indicated by a radio resource control (RRC) signaling,
      wherein if a previous interference measurement value was derived in the predefined time window, the previous interference measurement value is discarded,
      calculate interference measurement values of each of resource sets having different interference characteristics for at least one of a serving cell and a neighbor cell in the predefined time window by performing a restricted channel state information measurement, and
      transmit channel state information related with a specific radio resource based on an interference measurement value among the interference measurement values in the predefined time window,
   wherein the specific radio resource is configured to enable a usage of a radio resource to be changed within the predefined time window.

* * * * *